May 17, 1949.  R. C. SCOFIELD  2,470,652
INDUSTRIAL CONTACTING MATERIAL
Filed Nov. 30, 1946  3 Sheets-Sheet 1
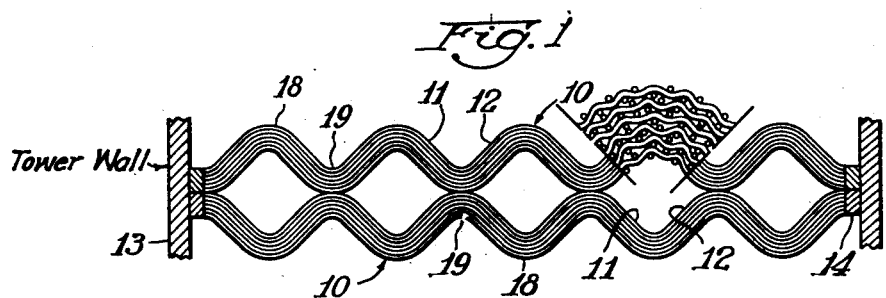
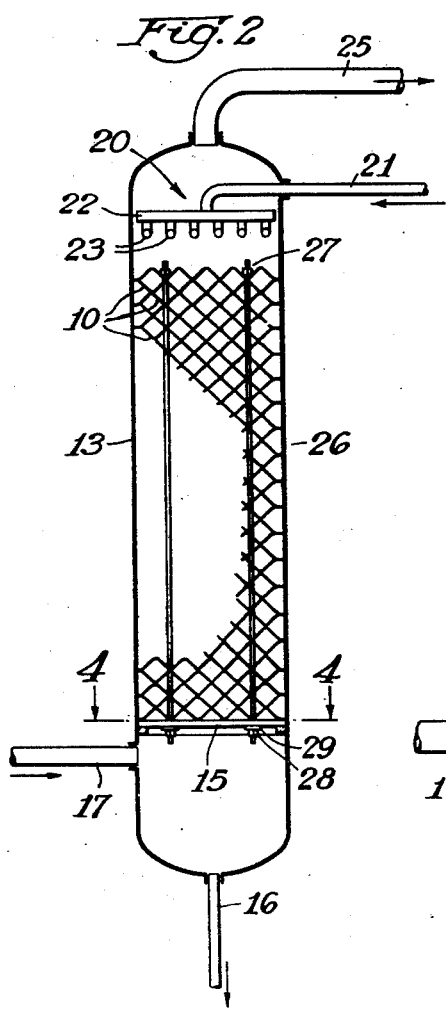
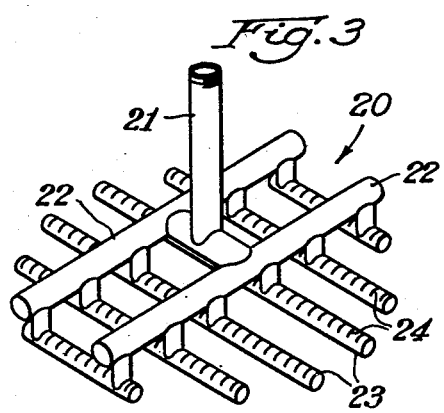
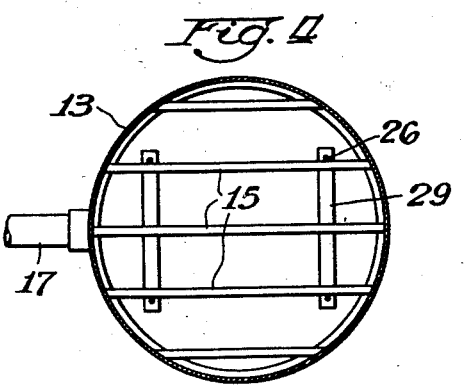
Inventor:
Raymond C. Scofield
By: Everett A. Johnson
ATTORNEY May 17, 1949.  R. C. SCOFIELD  2,470,652
INDUSTRIAL CONTACTING MATERIAL Filed Nov. 30, 1946   3 Sheets-Sheet 3

Inventor:
Raymond C. Scofield
By: Everett A. Johnson
Attorney

Patented May 17, 1949

2,470,652

UNITED STATES PATENT OFFICE 2,470,652

INDUSTRIAL CONTACTING MATERIAL

Raymond C. Scofield, Hitchcock, Tex., assignor to Pan American Refining Corporation, Texas City, Tex., a corporation of Delaware Application November 30, 1946, Serial No. 713,333

14 Claims. (Cl. 261—95)

This invention relates to a vapor-liquid and gas-liquid contacting device and, more particularly, is directed to a new type of packing suitable for vapor-liquid and gas-liquid contacting systems such as in fractionating, scrubbing, absorbing, stripping, rectifying, cooling and the like, wherein it is desirable to contact a liquid with a gasiform material such as vapors or gases.

This application is a continuation-in-part of my co-pending application Serial No. 564,358 filed November 20, 1944, later abandoned.

It is well recognized that in conventional bubble columns the relatively small areas surrounding the caps are the active regions for contact between liquid and gasiform materials and this space is small compared to the total cross-section of the tower. In spite of its low theoretical efficiency, however, the bubble tower has had wide acceptance because of the stability of its operation. Small, packed columns in which a mass of contacting materials such as Raschig rings, Berl saddles, crushed coke, glass wool, etc., substantially fills the column from top to bottom, have some utility for small installations but must be operated under closely controlled conditions. Where fractionation is important the operation of packed columns even in intermediate sizes has been found so critical that their use in industrial installations is substantially impossible.

It is therefore a primary object of this invention to provide a method and means for contacting vapor and liquids which are particularly adapted for large commercial operations and wherein almost the entire cross-sectional area of a given large diameter column is effective as a region for contact over wide ranges of liquid loading.

Another object of my invention is to provide a method and means wherein there is uniform distribution of both liquid and gasiform material throughout the available cross-section of a contacting zone. Another object is to provide a contact packing which will accommodate a large amount of distributed fluid within the tower without flooding. A further object is to provide a fractionating system of increased efficiency whereby the height equivalent to a theoretical plate (HETP) is greatly reduced. It is an additional object to provide a packing which effects continuous and uniform redistribution of the liquid across the active area of the column.

A more specific object of the invention is to provide an industrial packing which may be substituted for bubble caps and the like in a conventional tower for the purpose of increasing vapor and liquid throughput or for increasing fractionating efficiency, or both, while operating with a reduced liquid holdup. Another object is to permit precise fractionation under conditions of high vacuum without excessive pressure drop. An additional object is to provide a packing which is durable and substantially self-supporting for considerable heights. Still another object is to provide a packing which is efficient over a wide capacity range thereby providing a fractionating system of high flexibility. These and other objects will become apparent as the description of the invention proceeds.

In general these and other objects are attained by providing columns or towers packed with superimposed, non-filming meshed structures of such configuration and arrangement within the column that liquid will follow a repeatedly divided path laterally and downwardly, and a gasiform material will follow a continuous but tortuous path laterally and upwardly, which is transverse to the flow of the liquid within the meshed structures. Broadly, the system comprises a column which includes a foraminous packing unit defining a plurality of relatively symmetrical voids or cells defined by the adjacent mats which may be prismatic, cylindrical, tetrahedral or irregular. These cells are bounded by multi-layers of non-filming meshed structures in which the individual elements include fibers, strands, wires, ribbon-like members and the like.

The packing units or mats may comprise a plurality of nested, sheets of open-mesh gauze or fabric, crimped or undulated to the desired form, the mat having sufficient thickness to conduct a substantial portion of the liquid phase downwardly along the individual filaments or strands of which it is composed. Likewise, the immediately adjacent sheets of non-filming meshed fabrics are in non-registering or random relation and the overall construction permits the substantial unrestricted, but tortuous, flow of vapor through the interstices formed by the filaments of the fabric structures in each mat unit. Thus, liquid flooding is avoided while obtaining the optimum contact by means of transverse flow of liquid and vapor within the mat. Heretofore, such uniformity of contact and such capacity was not obtainable because of the conflict between the flow of liquid and vapor moving in opposite directions instead of transversely as provided by my improved construction.

It is important that a distinction be made between finely meshed structures which permit the formation of a continuous film of liquid between strands when momentarily immersed in a liquid having a surface tension within the range of about 25 to 75 dynes per centimeter and non-filming meshed structures which will not support such a continuous film when similarly treated. For the purpose of this specification, the term "nonfilming meshed structure" will be used to distinguish the type of foraminous sheet or porous material which, when wetted, retains an open mesh for free flow of vapors, from "filming" or capillary meshed structures in the prior art which support a continuous film of liquid over the surface of the sheet, preventing free flow of vapors therethru.

Filming meshed or capillary structures have relatively small distances between the spaced filaments or strands, whereas the "non-filming meshed structure" has a much greater minimum distance between adjacent members of the meshed structure, for example, 8 to 10 millimeters. It is with the non-filming meshed structure that the invention described herein is concerned.

In fabricating my packing elements, I have at all times kept certain fundamental objects in view. The merits of a coarse meshed screen as a basic material for industrial packing are several, viz., low cost, high permeability to gases and high ratio of liquid conducting surface to total area. A single sheet of such material is incapable of controlling or directing the flow of large volumes of liquid along its inclined surface and consequently a number of such superimposed sheets are required to give the desired ratio of drip-off to completed flow. Single sheets of mesh material having openings of capillary size will conduct liquid almost perfectly over its inclined surface, but the sealing of the foramina by liquid is a disadvantage which I have avoided.

A packing unit or mat may consist of multiple layers of self-supporting non-filming meshed structures shaped to provide inclined surfaces on the upper and lower boundaries of the mat. More particularly, these units may comprise a plurality of inter-locking or integral elements comprising filaments or strands of metal, plastics and the like. I prefer, however, to employ sheets of foraminous materials such as hardware cloth, wire screening, expanded metal lath and the like. The size of the foramina is important and in general, interstices should be between 0.15 and 0.5 inch for large scale installations but other meshed structures having larger or smaller openings can be used provided that the openings are larger in size than that which will support a continuous film of the liquid.

By way of illustration, in one satisfactory method of fabrication of my tower packing units, a suitable foraminous or screen-like material is chosen and pressed between dies to impart a parallel series of permanent sinuous or wave-like impressions to the sheets. A number of sheets, say 3 to 25, are then nested and cut to the shape of the tower as, for example, by means of a rotary file or high speed cut-off grinder, to form a single packing unit. The number of such units required is fixed by the height to which it is desired to fill a tower, the amplitude or perpendicular height of the waves impressed in the packing and the thickness of the individual packing units.

A particularly satisfactory material for the individual meshed structures is expanded metal sheet having integral ribbon-like members.

Between about 3 and 15 layers of expanded metal can be arranged in mats and held together by suitable fastening devices such as bolts, wire lacing and the like. The mats may be constructed of any suitable metal including steel, nickel, copper, aluminum or other metal or alloy particularly adapted for the contemplated contacting operation. Likewise, the meshed structure can be coated or painted if desired for protection against corrosion or to alter the wetting characteristics of the individual strands.

An essential feature of my invention is the arrangement of the contacting mats as a series of undulating elements horizontally across the flow area of the tower. The most convenient and preferred arrangement is that wherein the wave crests of one undulating mat are disposed immediately below the lowermost portions or valleys of the next succeeding mat. The undulating pattern of the packing mats can be conveniently obtained by corrugating, pressuring or folding the individual meshed structures to produce oppositely and alternately pitched surfaces. The individual shaped structures can then be assembled to produce a mat of the desired thickness or capacity. By shaping the mats in this manner, the liquid is enabled to flow laterally and downwardly along the spaced filaments or strands of the mat while permitting the transverse flow of gasiform material through the mat.

Packing units are installed in a tower horizontally and preferably with the crests of the waves of one unit parallel with and touching the lower boundary of the troughs of the unit above. In this way, cells are created between the units which serve the important purpose of providing space for intimate contact and suffusion of liquid migrating downwardly with gases or vapors traveling upwardly.

In operation a descending liquid partially penetrates the multi-layers of meshed structures and tends to flow downwardly along the filaments or strands within the confines of the multi-layered meshed structure. Thus, the path which the flowing liquid takes is highly extended. Gases or vapors flowing upwardly at the same time penetrate the multi-layers of meshed structures causing the liquid, which is descending, to intimately contact it both within the meshed structures as well as in the voids which are bounded by the multi-layers. In the case of a properly loaded tower, the various mechanisms of vapor-liquid contact are as follows: vapor sweeping past wetted filaments; vapor picking up liquid from one filament and impinging it against another filament in the vapor path; perforation of the liquid phase by the vapor stream to form bubbles; boiling; foaming; dispersion of liquid as droplets of spray and mist in the vapor stream within the free space compartments; and entrainment arresting effect of the bottom layers of a meshed structure. It is apparent that any bubbling and droplets in the free space compartments or cells of the packing, which increase markedly the interfacial contact area, are not detrimental since the entrainment is substantially removed from the vapor stream by the bottom few layers of the succeeding tray. This behavior gives rise to a very high contacting efficiency and therefore minimum HETP while maintaining relatively stable operating conditions. The upflowing gases are not required to penetrate continuous supported films of liquid since the meshed material is incapable of supporting such a film. Thus, the resistance to gas flow within the contacting units is relatively small. Likewise, the descending liquids, although they follow a tortuous path, not being forced to penetrate relatively small openings, meet with little resistance to flow and make high throughputs possible.

As pointed out above, the high capacity and improved efficiency of my system results from a unique combination of elements. In operation, at low tower loadings substantially all the contacting may be within the inclined mat structure. As either the vapor or liquid rate is increased, some of the liquid is brought to the upper surface of the mat and flows in part upon the upper inclined surface, collecting in the valleys and draining through the valley to the underlying ridge of the packing element immediately below. At still higher loadings liquid is blown off the screen or mat into the cells defined by the adjacent undulating mats and therein assumes the appearance of a violently boiling liquid. This affords excellent contact of gas and liquid within the cells.

The efficiency of a tray may be improved by constructing the lowermost layers of the tray of relatively fine mesh (e. g. ¼ inch hardware cloth) suitable both for removing entrainment and operation at relatively low loadings, while the uppermost layers may be of coarse mesh (e. g. ½ inch hardware cloth) having high load carrying characteristics. Thus, a tray made with variable mesh size provides for contact at low operating rates primarily within the fine mesh or lower layers of the tray. At high rates the contacting is carried into the coarse mesh upper layers of the tray as well as the free space compartments. As liquid accumulates in the valleys, sufficient head is developed to insure drainage through the fine mesh layers in the valleys even at high liquid rates.

As indicated hereinabove, packed fractionating towers have been used in small laboratory apparatus where critical control of operating conditions was possible, whereas in large industrial installations channelling of the reflux liquid and vapor has been almost impossible to control. It is also known that once channelling starts, it tends to become more acute until an operation obtains in which most of the liquid is flowing down one side of the column while the vapor passes up the other side of the column. In the present invention, there is uniform distribution of liquid across the tower area, irrespective of size. Also, there is no channelling tendency; in fact, the packing acts to produce uniform distribution. This has been proven in tests in which a stream of liquid has been introduced at a single point at the top of a rectangular tower and it has been found that the liquid dripping off the packing after passage through five layers or elements has been essentially uniform with only a single point of introduction of the entering liquid stream.

Performance tests on the packing described herein show that both the tower capacity and efficiency obtained by this industrial fractionation packing are higher than that for bubble cap towers. The HETP (height of an equivalent theoretical plate) observed with a binary mixture was only about 35% of the HETP value for bubble cap towers at similar rates. Based on observed values, an ordinary 20 plate refinery bubble tower can be refilled with the new packing and converted into a fractionator having the equivalent of over 55 plates and with an allowable thruput higher than the maximum capacity of the original tower.

By this invention both the vapors and liquids are caused to be redistributed many times across the column without excessive accumulation at any point since the liquid is distributed from the multiplicity of contact lines between the adjacent packing units. The multiple alternately and oppositely pitched mat arrangement provides large areas of packing material within a short column and yet retains adequate pitch to provide the proper rate of drainage. In this way, fractionating columns of greatly increased capacity are obtained without sacrificing the efficiency of precise fractionation.

The invention will be more readily understood from the following description and the accompanying drawings which illustrate certain embodiments thereof and wherein:

Figure 1 is a section through units of the packing illustrating the multiple layers of wire screen and the multiple alternately oppositely pitched surfaces;

Figures 2 is a vertical section showing a column with a plurality of packing units in their operative position;

Figure 3 illustrates one form of reflux distributors;

Figure 4 is a section taken on line 4—4 of Figure 2;

Figure 5:
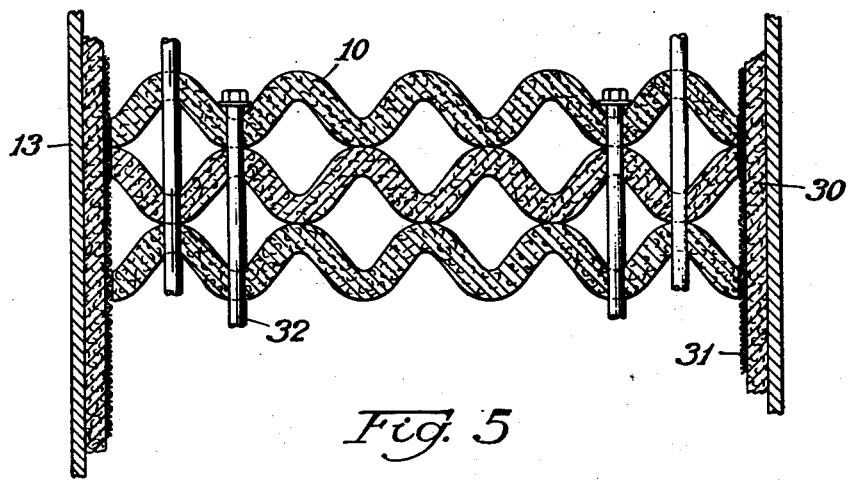
Figure 5 is a vertical section showing the details of one modification of the seal at the chamber wall.

Referring to Figures 1 and 2 of the drawings, each foraminous sheet is preferably cut with the strands or filaments on the diagonal and roughly shaped to the undulating pattern, with oppositely and alternately pitched surfaces 11 and 12. Uniform distribution of liquid across the flow area of the individual section is favored by using a foraminous sheet having the strands on a bias with respect to the ridges and valleys produced by the alternately and oppositely pitched surfaces. If desired, the ridges of successive packing elements or "plates" may be rotated as much as 90°, thereby supplementing distribution in all directions.

In fabricating the packing unit, the separate elements can be roughly shaped. When working with unbonded screen made of wire strands, it is desirable to employ a deformable flexible sheet, such as building paper on both sides of the screen during the forming step. This prevents distortion of the screen openings on the ridges. Bonded hardware cloth and expanded metal do not distort, however. A plurality of the roughly shaped pieces of foraminous sheets are nested and formed into a single unit 10 by compression under a drop forge hammer. The unit is then cut to fit the tower. In order to minimize short circuiting the units 10 by the liquids, a packing 14 may be employed between the unit and the tower wall.

The elevations or ridges and depressions or valleys of adjacent plates or trays are preferably brought into close incidence and contact and the separate elements can be fixed or pinned together. Thus, for example, tie bolts 26 can be provided to extend between the bottom packing support 15 and the topmost packing unit 10. A parallel series of bars or tubes 15 located above the lower trapout 16 and above the vapor inlet 17 supports the packing units 10. These bars 15 are transverse of the ridges 18 and valleys 19 of the lowermost of screen packing units 10. The upper end of tie bolt 26 is preferably threaded so that the units 10 can be compressed by drawing downwardly on nut 27. The tie bolt is illustrated as passing through the shell 13, but if desired, a separate top packing support can be installed across the top of chamber 13. The packing elements held in place by the tie bolt 26, together with the top and bottom packing supports 29, can then be withdrawn as a unit.

Reflux or intermediate introduction of tower feed can be effected by the use of a suitable distributor 20. The character of the packing, however, is such that after the liquid has passed through a few packing units, the liquid distribution is uniform. Figure 3 illustrates one type of distributor 20 including inlet 21, parallel manifolds 22, and distributor pipes 23. Slots 24 on the upper side of distributor pipes 23 permit the uniform discharge of the liquid over substantially the entire flow area of the topmost tower packing. The distributor pipes 23 may be parallel to, and in contact with, the ridges of the uppermost packing unit 10 to effect optimum distribution.

In operation, vapors are supplied to the tower 13 by vapor inlet 17, liquid is withdrawn as bottoms by trapout 16, fractionated vapors are removed overhead by line 25, condensed and a portion of the condensate returned as reflux liquid to the top unit 10 in tower 13. Other trapouts may be provided in tower 13 for recovery of intermediate fractions as desired.

The tower 13 may contain both a rectifying and a stripping section in which case packing of different amplitude, wave length and mat thickness may be used in the separate sections. In general, a packing having a high amplitude is well adapted for handling high liquid loads and packing having a low amplitude finds particular utility with low liquid loads. By high amplitude is meant a packing unit or mat having an overall height of about 4″ or more, the sloping sides of which form an angle with the horizontal of between about 60 and 85°. A low amplitude packing is one which has an overall height of between about 2″ and 4″, the sloping sides of which form an angle with the horizontal between about 30 and 60°. The radius of curvature of the mats at crests and hollows is sufficiently moderate so that rupture or the formation of sharp angles during the shaping operation will not occur and may be, for example, ⅜ inch or greater. Either the woven or integral strand can be used for these high and low amplitude packings, but the expanded metal (integral strands) is particularly adapted for the high amplitude embodiment.

Figure 5 illustrates the details of assembly in another modification of my system. Adjacent the tower shell 13 is a packing 30 which may comprise asbestos or glass rope. An inner support for the packing 30 comprises a screen or metal lath sheet 31. Groups of the units or mats 10 are tied by hold-down bolts 32. If desired, pairs of mats 10 can be bolted together and groups comprising several pairs can be joined and introduced as a cartridge.

Figure 6:
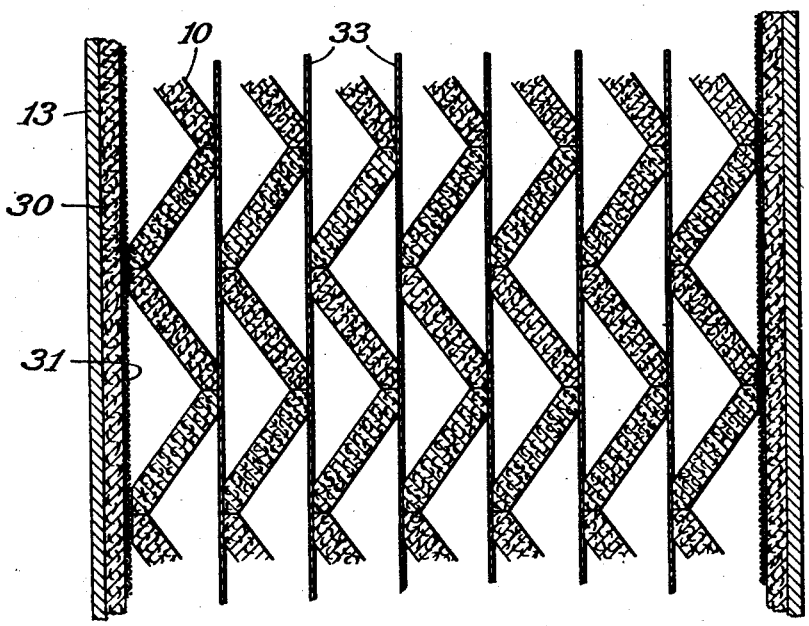
Figure 6 shows a modified arrangement of the sloping mat sections.

Figure 6 illustrates another embodiment of my invention wherein the contacting units or mats are disposed vertically within the contacting tower 13 between baffles 33. As in the other modifications, the direction of liquid flow is influenced by the strands of the mat 10 and the vapors pass transversely through the mat. If desired, the baffles 33 can be concentric. In that event, the mats 10 can comprise annular units which are V-shaped in cross-section and superposed in the annular baffled zones. Separate gasiform fluid supply means and separate liquid supply means are not shown on the drawing but can be provided for each baffled zone.

The number of foraminous sheets used to comprise a mat 10 depends upon the slope, the size of opening in the network and the liquid loading. The number can vary from about 3 to about 25, with high liquid loading and coarse mesh requiring relatively more sheets per unit than low liquid loads and smaller mesh sheets. A slope of at least 45° favors efficiency at low loading because of the decreased tendency for liquid to fall through the wires into the free space. For a given wire mesh size and a given slope between the limits of 30° and 85° with the horizontal, the capacity of the tower is increased roughly in proportion to the slant height where slant height is defined as the straight line distance between a crest and an adjacent hollow, measured along the sloping mat. It is usually necessary to increase the number of foraminous sheets employed in a unit as the slope angle is decreased for the purpose of supporting the additional liquid loading. Between slope limits of 30° and 85° for a given slope the fractionating efficiency of a given plate is increased roughly in inverse proportion to the slant height of a packing unit. Thus, the packing employed in a given tower can be modified by changing the slant height to favor either exceptionally high capacity or exceptionally high fractionating efficiency. Slant heights between 1 and 15 inches are contemplated in conjunction with slopes of between about 30 and about 85 degrees. A sufficient number of layers are employed to prevent excessive dripping through the packing at the lowest vapor and liquid rates of intended operation.

The mesh size is such that vapor can contact the liquid flowing along the wires and accumulating in the hollows or troughs of the mat without substantially impeding net liquid flow. Mesh sizes from about a minimum of 16 to a maximum of 1 per inch are contemplated, and are chosen such that the openings are greater than that which tends to seal with the liquid.

Figure 7:
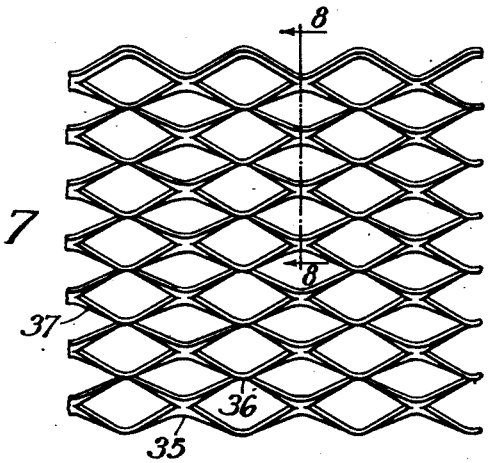
Figure 7 is a view of a fragment of an expanded metal sheet which has been slit and expanded.
Figure 8:
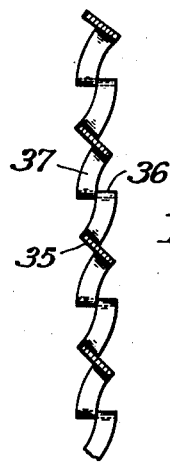
Figure 8 is a detailed sectional view on an enlarged scale as taken on the line 8—8 of Figure 7.

Figures 7 and 8 illustrate the expanded metal sheet of the type employed in my system. In making the expanded metal sheet a blank of metal having the desired gauge is provided with rows of slits 34 so arranged that those in one row overlap and are disposed between those of adjacent rows. When expanded the slit sheet has diamond-shaped openings 34a and transverse rows of bonds or bridges 35 and 36, respectively. The areas between the overlapping slits 34 define the strands 37 which extend diagonally of the sheet and are connected at their intersections by the integral bonds 35. The strands 37 and bonds 35 are disposed edgewise at an angle to the plane of the sheet.

Figure 8 illustrates that the bonds 35 in each alternate transverse row extends edgewise and perpendicularly to the plane of the sheet while the bonds 36 in each intermediate row are inclined and extend edgewise at an angle of about 60° to the plane of the sheet. Thus, the non-filming meshed structures have a "rough" surface resulting from having the bonds in one-half of the rows disposed edgewise and perpendicularly to the plane of the sheet and with the other half disposed edgewise at an angle. This arrangement gives the sheet rigidity and a multiplicity of contact points. Likewise, when the expanded metal sheet is formed into the undulating pattern the "rough" surface of the alternately and oppositely pitched surfaces provides a great multiplicity of points from which the liquid can cascade within the mat.

Figure 9:
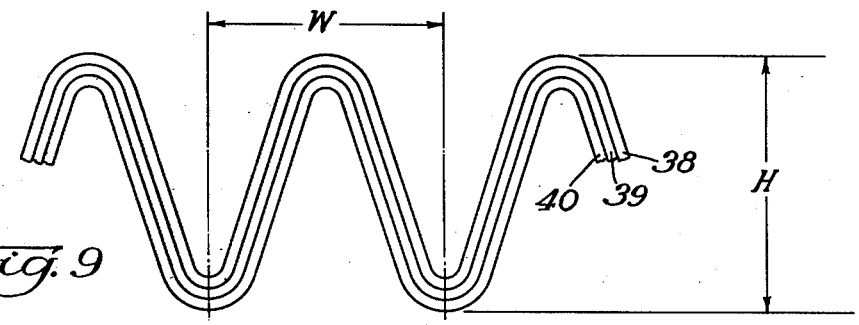
Figure 9 is a section through a mat diagrammatically illustrating the layers of expanded metal and the multiple alternately, oppositely pitched surfaces.
Figure 10:
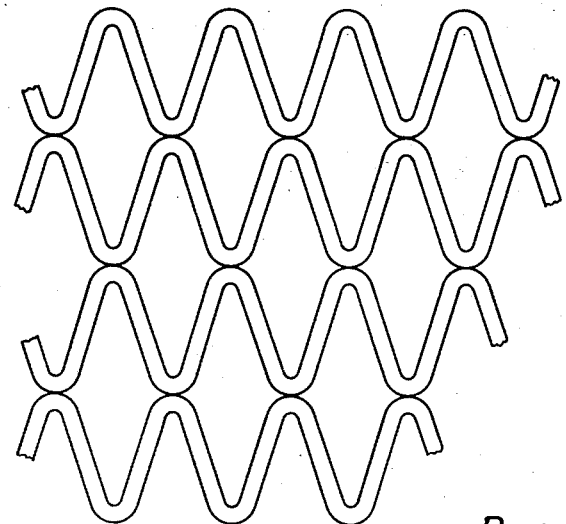
Figure 10 is a vertical section showing a plurality of packing units of the type illustrated in Figure 9 in their operative position.

Referring to Figures 9 and 10, the packing may comprise between about 3 and 15 layers of non-filming meshed structure such as the expanded metal sheet. In one embodiment I have employed seven layers of ⅜ inch expanded metal lath to produce a mat having a thickness of between about ⅞ and ½ inch. The mat was bent on a ⅜ inch radius to give a height H of about 4 inches and wave length W of about 3.75 inches. Another useful form which I have constructed has the same height H but a wave length W of 7.0 inches. Many other variations are contemplated.

When a plurality of such mats are arranged as diagrammatically illustrated in Figure 10, an effective tower packing results. This type of packing is superior to that shown in Figure 1 for general purpose applications and has special suitability for applications involving high liquid loads. The advantages are reflected in higher capacity, wider ranges of good distribution of fluids and volumetric efficiencies considerably in excess of 5 to 1 over bubble columns.

On a cost basis the packed towers have a decided advantage over conventional bubble towers. Likewise, a study of the comparative costs of wire screen and expanded metal sheet indicates that from the process standpoint it is much more expensive to draw out wires and weave them in the desired wire mesh than to stamp and draw diamond mesh expanded metal sheet. Thus, there are both mechanical and economical advantages in favor of metal lath for general commercial application.

The following examples illustrate that an improvement is obtained in both fractionating efficiency and tower capacity over conventional bubble cap towers:

Twelve layers of ¼ inch hardware cloth were formed individually, then superimposed and collectively compacted under a drop forge hammer between dies into a single corrugated unit. In this operation many of the wires of the screens were brought into capillary contact. The bottom die employed one inch O. D. tubes disposed parallel to each other in a horizontal plane and fixed in an elevated position above a flat plate, said tubes being 3½ inches between centers. The upper die was identical but was employed in an inverted position and disposed so that the tubes of the upper die passed midway between the tubes of the bottom die. The twelve layers of screen were compacted to a thickness of about .5 inch in the finishing operation until the overall height of the packing layer was approximately 2 inches. These layers were cut to a radius of 11.25 inches for installation in a 23.25 inch I. D. tower. The annular space between the packing and the wall was caulked with ⅝ inch asbestos rope. The packing was installed to a depth of 62 inches in the manner of Figure 2.

The vapor supplied to vapor inlet 17 was at atmospheric pressure and contained 10.6 mol per cent benzene and 89.4 mol per cent toluene. The vapor leaving the tower through the vapor outlet 25 was totally condensed, cooled to a temperature of 89° F. and returned to the tower through the reflux inlet pipe 21. The trapout liquid from 16 passed to a still where it was revaporized and admitted to inlet 17. The reflux stream analyzed 69.0 mol per cent benzene and 31.0 mol per cent toluene. An orifice meter in the reflux inlet pipe 21 registered a flow of 390 G. P. H. (at 60° F.). At this relatively low rate of about 64 to 79 per cent of the maximum allowable rates for bubble cap towers, an HETP of 18.2 inches was calculated. The maximum allowable rate for bubble cap towers was calculated from the formula $$u = K_V \sqrt{\frac{d_1 - d_2}{d_2}}$$

(Chemical Engineers' Handbook, Perry, 2nd edition (1941), pages 1449–1450) where $u$ = superficial vapor velocity, ft./sec.
$K_V$ = constant. For 24 inch tray spacing the value ranges from 0.185 for 0.5 inch liquid seal to 0.150 for 3 inches liquid seal.
$d_1$ = density of liquid
$d_2$ = density of vapor The same operation, if performed in the conventional bubble-cap type of tower with 24 inch tray spacing and showing an overall plate efficiency of 54% would require a column 155 inches high instead of 62 inches. Under those conditions of low rate operation, the packing performance was superior to bubble cap performance.

Using the same apparatus as in the above example, except for a packed depth of 49 inches, and operating at a pressure of 0.3 p. s. i. g. at the tower inlet 17, the composition of the entering vapor was 11 mol per cent benzene and 89 mol per cent toluene. The vapor leaving the tower was totally condensed, cooled to 109° F. and returned as reflux through inlet pipe 21. The reflux stream amounted to 825 G. P. H. (at 60° F.) and analyzed 89.8 mol per cent benzene and 10.2 mol per cent toluene. This loading is equivalent to 137 to 170 per cent of the maximum allowable rate for bubble cap towers. The calculated HETP of 10.4 inches compares with an estimated value of 45 inches for conventional bubble cap towers with 2 feet tray spacing. It is apparent that a conventional bubble tower would not only require a larger cross section area but would also have to be 4.3 times as tall to effect the same degree of fractionation as indicated by the above example.

I have described hereinabove one way to form the corrugated layers but others may be used. For example, I may also use a pair of intermeshed corrugated or toothed rolls through which the foraminous material is fed, one or more layers at a time, to give it the desired shape. Material shaped in this way may then be assembled into mats of the desired thickness as described.

For convenience in handling and installing packing in large diameter commercial fractionating towers, such as towers having diameters of from 3 to 8 feet, I may cut the packing unit or mat into parallel sections which can be inserted through convenient manholes in the wall of the tower and reassembled within the tower. Such sections may be bound around with wire cloth or sheet metal which may be spot welded to the edge of the mat to impart mechanical stability.

In addition to undulating shaped packing, the wire screen sheets can be pressed or shaped to form a plurality on each plate of cones or pyramids which are alternately upright and inverted in position. A multiplicity of these sheets are superimposed in such a manner that upright cones nest with upright cones and inverted cones nest with inverted cones and the sheets so disposed are compacted to comprise a single unit. Units are then superimposed in the column so that vertexes of one unit meet vertexes of an adjacent unit and pyramidal or conical bases are brought into contact with corresponding peaks of an adjacent unit. The screen mesh used in the pyramidal or conical packing is larger than capillary size and permits simultaneous passage of vapor and liquid through the same pores of a unit. Use of the same mesh size range as indicated for the undulating form of packing is contemplated, together with the ranges of slopes and slant heights.

The form of packing shaped like a modified sine curve has been illustrated but other shapes are contemplated. Single V-shaped elements have been successfully used, although it is necessary to work to closer tolerances to assure proper alignment and contact between the ridges and troughs of adjacent unit elements. By rounding the peaks as shown in Figure 1, alignment is not so critical. True sinusoidal shape or any similar shape of an undulating character should be satisfactory. Other details of the constructions adapted to permit transverse flow of vapors and liquid flow along the strands of the foraminous sheet will occure to those skilled in the art.

Although I have described my invention with reference to certain embodiments thereof, it is contemplated that various changes can be made within the scope of my invention without departing from the spirit thereof. It is, for example, possible and may be in some instances advantageous, to fabricate the individual packing units or mats from screen-like material of assorted mesh size, provided the smallest mesh used does not film over when momentarily immersed in a liquid having a surface tension of 25–75 dynes per centimeter.

What I claim is:

1. An apparatus for countercurrent contacting of vapor and liquid comprising a plurality of superposed porous mats of undulating shape, the ridges of each mat contacting the troughs of the mat above it to provide for downward flow of liquid through s'd apparatus, each mat comprising a plurality of undulating foraminous metal sheets in capillary contact, the openings in said sheets being larger than capillary size and in nonregistering relation, thereby forming tortuous vapor passages through said mats unsealed by said liquid.

2. The apparatus of claim 1 in which said sheets are comprised of expanded metal.

3. In a packed vapor-liquid contacting apparatus comprising a tower and a plurality of spaced horizontally disposed contacting elements, the improvement wherein said elements comprise undulated mats of filamentous material having a porosity sufficiently large to render them incapable of supporting a continuous film of liquid, thereby providing open passages for the flow of gasiform fluids transversely thru said mats and for simultaneous flow of liquid laterally therethru in an inclined downward direction substantially transverse to the flow of said gasiform fluid, said undulated mats being arranged with the ridges of one coinciding and in capillary contact with the valleys of the mat above it, thereby providing a path for the flow of liquid between said contacting elements.

4. In apparatus employing a plurality of vertically disposed foraminous units for contacting vapors and liquids, a stationary packing unit comprising a mat of a plurality of undulated wire screen sheets in capillary contact having alternately and oppositely pitched surfaces, the slope of the surfaces being between about 30 and 60 degrees, the openings in said sheets being larger than capillary and arranged in nonregistering relation to provide tortuous passages for vapor through said mat, the ridges of one unit coinciding and in contact with the valleys of the unit next above it.

5. A packing unit for use in vapor and liquid contacting apparatus comprising a stationary mat composed of a plurality of sheets of foraminous material having openings larger than capillary and having alternately and oppositely pitched plane surfaces, the corresponding surfaces of contiguous sheets within said mat coinciding with each other and being in capillary contact, said alternately and oppositely pitched surfaces being adapted to permit the simultaneous flow of liquid laterally and downwardly through the said mat and provide for tortuous flow of vapors transversely therethrough, a plurality of said units being arranged, one above another, in a contacting tower, the ridges of one unit coinciding and in contact with the valleys of the unit next above it.

6. A packing unit for use in vapor-liquid contacting apparatus comprising a stationary mat of wire mesh foraminous material having a pattern of substantially uniformly spaced ridges and valleys and adapted to form with adjacent units a multiplicity of disconnected cells, the ridges and valleys being disposed on the bias with respect to the individual wires forming the wire mesh and the mesh size being greater than capillary, providing open but tortuous vapor passages through said mat in a transverse direction, a plurality of said units being arranged, one above another, in a contacting tower, the ridges of one unit coinciding and in contact with the valleys of the unit next above it.

7. Apparatus for liquid and vapor contacting comprising a plurality of stationary packing elements supported in superposed relationship within a column to provide a plurality of cells, each of said elements comprising a unitary member constructed of a mat of a plurality of layers of wire fabric in capillary contact, said fabric having larger than capillary openings and being characterized by having alternately and oppositely pitched plane surfaces, the ridges of one element coinciding and in contact with the valleys of the element next above it.

8. Apparatus for effecting contact between liquid and vapor which comprises a plurality of stationary undulated elements supported in superposed relationship within a column, each element comprising a mat of a plurality of layers of wire fabric having openings greater than capillary size, said layers being in capillary contact within each mat, and said elements being adapted to effect three-dimensional distribution of the liquid being contacted as it flows over the wetted surfaces of said wire while vapors pass transversely through tortuous passages in said elements, the ridges of one element coinciding and in contact with the valleys of the element next above it.

9. Apparatus for liquid and vapor contacting comprising a plurality of stationary packing elements supported in superposed relationship within a column, each of said packing elements comprising a mat of a plurality of wire mesh layers in capillary contact, the openings in individual layers being larger than capillary and the element being characterized by having a plurality of substantially parallel alternate elevations and depressions running on the bias of the wire making up the mesh, the elevations of one element coinciding and being in contact with the depressions of the element next above it.

10. Apparatus for liquid and vapor contacting comprising a plurality of stationary packing elements arranged within a column in superposed relationship, each of said elements comprising a mat of wire fabric, including a multiplicity of wire fabric sheets in capillary contact, the openings in individual sheets of said wire fabric being larger than capillary, said mat being characterized by having a plurality of alternate ridges and valleys of substantially constant separation, successive mats being arranged within the column so that the ridges contact valleys of superimposed mats.

11. Apparatus for liquid and vapor contacting comprising a plurality of stationary packing elements supported within a column in superposed relationship to provide a plurality of cells, each of said elements comprising a mat composed of a plurality of layers of wire fabric having larger than capillary openings and arranged in capillary contact, said elements being characterized by having alternately and oppositely pitched plane surfaces and capable of effecting three-dimensional distribution of the liquid under treatment, successive pairs of elements being arranged with respect to each other with the ridges of one element coinciding and in contact with the valleys of the element next above it, so as to provide isolated cells therebetween accessible to vapors through tortuous passages in said elements.

12. Packing for fractionating equipment comprising a plurality of separate stationary units disposed in superposed relationship within a column, each of said units comprising a mat of foraminous sheet material in capillary contact, providing for flow of liquid along the wetted surfaces of said material within said mat, said units being inclined to form a succession of alternately and oppositely pitched surfaces, said foraminous sheet material having larger than capillary openings and arranged in nonregistering relation to form tortuous vapor passages through said units unsealed by said reflux descending through said fractionating equipment, the ridges of one unit coinciding and in contact with the valleys of the unit next above it.

13. An apparatus for countercurrent contacting of vapor and liquid comprising a plurality of stationary superposed porous mats of undulated shape, the ridges of each mat contacting the troughs of the mat above it to provide for downward flow of liquid films through said mats, each mat comprising a plurality of undulated foraminous metal sheets in capillary contact, the openings in said sheets being larger than capillary size and in nonregistering relation, thereby forming tortuous vapor passages through said mats unsealed by said liquid.

14. In apparatus employing a plurality of vertically disposed foraminous units for contacting vapors and liquids, a stationary packing unit comprising a mat of a plurality of undulated expanded metal sheets in capillary contact having alternately and oppositely pitched surfaces, the slope of the surfaces being between about 30 and 60 degrees, the openings in said sheets being larger than capillary and arranged in nonregistering relation to provide tortuous passages for vapor through said mat, the ridges and valleys of adjacent units coinciding and being in contact with each other, thereby forming a plurality of cells accessible to vapors through said tortuous passages in said mat.

RAYMOND C. SCOFIELD.

REFERENCES CITED

The following references are of record in the file of this patent:

UNITED STATES PATENTS

| Number | Name | Date |
| --- | --- | --- |
| 1,749,266 | Sontag | Mar. 4, 1930 |
| 1,848,945 | Genter | Mar. 8, 1932 |
| 2,375,336 | Weitkamp | May 8, 1945 |

FOREIGN PATENTS

| Number | Country | Date |
| --- | --- | --- |
| 745,073 | France | May 2, 1933 |
| 427,087 | Great Britain | Apr. 16, 1935 |